(12) United States Patent
Poston

(10) Patent No.: US 7,535,875 B2
(45) Date of Patent: May 19, 2009

(54) AUTO-CONFIGURATION OF SPECTRUM USE BY WIRELESS PRE-PLANNED OR AD HOC NETWORKS

(75) Inventor: Jeffrey D. Poston, Reston, VA (US)

(73) Assignee: The Mitre Corporation, McLean, VA (US)

( * ) Notice: Subject to any disclaimer, the term of this patent is extended or adjusted under 35 U.S.C. 154(b) by 477 days.

(21) Appl. No.: 11/410,149

(22) Filed: Apr. 25, 2006

(65) Prior Publication Data

US 2007/0248061 A1    Oct. 25, 2007

(51) Int. Cl.
*H04B 7/216* (2006.01)
(52) U.S. Cl. .................. 370/335; 370/328; 370/329; 370/339; 370/350; 455/450
(58) Field of Classification Search .............. 370/335, 370/328, 329, 338, 350; 455/450
See application file for complete search history.

(56) References Cited

U.S. PATENT DOCUMENTS 6,636,738 B1 * 10/2003 Hayashi ................. 455/450

OTHER PUBLICATIONS

Guido Hiertz, Philips, et al., *Wi-Mesh Alliance Proposal for 802.11 TGs*, doc.: IEEE 802.11-05/573r3, slides 1-63, Jul. 2005.

* cited by examiner

*Primary Examiner*—Nghi H Ly
(74) *Attorney, Agent, or Firm*—Sterne, Kessler, Goldstein & Fox P.L.L.C.

(57) ABSTRACT

A method of, and a wireless device capable of, dynamically allocating radio spectrum access within a wireless communication system includes a wireless transceiver having at least a physical layer functionality to transmit and receive data across a wireless network. The device extracts measurements of radio spectrum conditions from a least one of a local and a remote wireless transceiver to form an assessment of radio spectrum conditions. The device then integrates the assessment of radio spectrum conditions to form an integrated assessment of radio spectrum conditions between the local and remote wireless transceivers. The device further possesses a means for selecting a preferred set of radio spectrum access parameters for a communications session between the local and remote wireless transceiver.

30 Claims, 11 Drawing Sheets

AUTO-CONFIGURATION OF SPECTRUM USE BY WIRELESS PRE-PLANNED OR AD HOC NETWORKS

BACKGROUND OF THE INVENTION

1. Field of the Invention

The present invention relates generally to the field of wireless communications. More specifically, the present invention relates to a wireless device for allocating radio spectrum access in a wireless communication system.

2. Background Art

The configuration of wireless communications systems, and the allocation of radio spectrum access to wireless devices within these communications systems, has traditionally followed one of two extreme paths. In pre-planned wireless networks, the system designer typically assumes complete control over the operation of wireless devices that use a specified set of radio spectrum access parameters across a particular coverage area. Unlicensed systems have historically taken the opposite approach when configuring their access to radio spectrum resources. These systems assume a minimal knowledge of and no control over other types of wireless devices operating within a particular geographic area.

However, the radio spectrum access in mobile, ad hoc wireless networks is not easily configurable using the conventional means applied to either pre-planned wireless networks or unlicensed wireless networks. The mobile nature of ad hoc wireless systems severely limits the applicability of the detailed planning tools and the site surveys that are used to configure pre-planned wireless networks. Thus, in general, ad hoc networks are configured to access radio spectrum using a single set of radio spectrum access parameters that may not accurately reflect existing network conditions. In fact, recent reports indicate that congestion in wireless "hot spots" results not from the scarcity of radio spectrum resources, but from an inefficient means of accessing those resources.

The configuration and operation of wireless local-area network (WLAN) mesh networks, or ad hoc networks, is described within the draft IEEE 802.11s specification developed by "Working Group 11" of the IEEE LAN/MAN Standards Committee (IEEE 802) (e.g., see "Proposal Summary: Wi-Mesh Alliance Proposal B:31", as described at http://www.ieee802.org/11/DocFiles/05/11-05-0573-03-000s-wi-mesh-alliance-proposal-summary.ppt, hereafter known as the "draft specification" and incorporated herein by reference in its entirety). The draft specification addresses the pressing need for the intelligent allocation of radio spectrum access in ad hoc networks, and it details a proposed Distributed Resource Control Access (DRCA) protocol through which two wireless devices within an ad hoc network negotiate their future access to IEEE 802.11-compatible radio spectrum. FIG. 1 is an illustration of the proposed DRCA protocol between two wireless devices.

The DRCA protocol, as outlined in FIG. 1, requires that one node, the source mesh point (Source MP), submits a Mesh Transmit Opportunity (MTXOP) to a second node, the destination mesh point (Dest MP), across a designated radio channel. The MTXOP contains a range of radio spectrum access parameters acceptable at the source mesh point for data transfer to the destination mesh point. The destination mesh point, upon receipt of the MTXOP, must either agree to the proposed set of radio spectrum access parameters and select a specific set of access parameters from that proposed set, or reject the proposed set of radio spectrum access parameters and submit a counter-proposal to the source mesh point containing an additional set of radio spectrum access parameters.

In the first case, when the destination mesh point has responded with an operating configuration within the proposed range, the source must acknowledge that response to complete the DRCA protocol. In the second case, the source mesh point must select a set of operating parameters from within the counter-proposed range and send an acknowledgment to the destination mesh point, or it must reject the counterproposal and send a message acknowledging that rejection. The destination mesh point then acknowledges the decision of the source mesh point regarding the counter-proposed range of radio spectrum access parameters.

Although addressing the need to automatically configure the radio spectrum usage within an ad hoc wireless network, the draft specification is insufficient to meet the increasing demands on wireless bandwidth brought about by the interaction of ad hoc wireless networks with pre-planned and unlicensed wireless networks. Specifically, the draft specification fails to address the quality of a proposed range of radio spectrum access parameters. The DRCA protocol requires the source and destination nodes need only to exchange a binary indication as to whether a particular set of radio spectrum access parameters is "clear" and available for use. However, in order for ad hoc wireless networks to access radio spectrum resources in an optimum fashion, it is essential to characterize both the accessibility of radio spectrum resources and the quality of these accessible resources.

Further, the draft specification requires that the radio spectrum resources be quantified in terms of contiguous channels (i.e., the division of radio spectrum into frequency bands). This requirement is especially limiting when allocating radio spectrum access in wireless networks composed of non-conventional wireless devices such as "smart" radios. These emerging technologies are able to access radio spectrum resources non-contiguously in frequency, time, and geographic position.

The proposed DRCA protocol for negotiating radio spectrum access also fails to inform the participating devices as to why a particular negotiation fails. This failure prevents the proposed DRCA protocol from implementing adaptive algorithms that learn from pervious failed negotiations and improve future performance based on these previous failures.

A need thus exists for methods that facilitate the dynamic allocation of radio spectrum access to wireless devices operating within a wireless network and for wireless devices that are able to implement these methods to dynamically allocate their radio spectrum access. These methods and devices must be capable of assessing not only the availability of radio spectrum resources, but the quality of those resources. Further, these methods and devices must assess radio spectrum access not only in terms of frequency bands or channels, but non-contiguously in terms of frequency, time, and geographic position. These novel methods and devices must also facilitate the adaptive allocation of radio spectrum access by providing guidance regarding the rationale behind a failed negotiation in an effort to improve future performance.

These novel methods and wireless devices are beneficial to the operation of existing, pre-planned wireless networks, as they provide a dynamic means of modifying radio spectrum access in response to changing radio spectrum conditions.

Further, these novel methods and devices are especially beneficial to configuration and operation ad hoc wireless systems. They provide a means to identify the accessible radio spectrum and to assess the quality of that accessible radio spectrum. Through this assessment, the invention could allocate an "optimum" set of radio spectrum access parameters for a communication session under a given set of ad hoc network conditions.

BRIEF SUMMARY OF THE INVENTION

In one aspect, the invention is a wireless device capable of dynamically allocating its use of radio spectrum within a wireless communications system. The wireless device comprises a wireless transceiver having at least a physical layer of functionality to transmit and receive data across a wireless network. Measurements of radio spectrum conditions are extracted from at least one of a local wireless transceiver and a remote wireless transceiver to form an assessment of radio spectrum conditions. This assessment of radio spectrum conditions is then integrated to form an integrated assessment of the radio spectrum conditions for a communications session between the local and the remote wireless transceivers. The device then selects a preferred set of radio spectrum access parameters for the communications session. The set of preferred radio spectrum access parameters may represent an optimum set of radio spectrum access parameters, and the set of radio spectrum access parameters may further represent the accessible radio spectrum contiguously or non-contiguously. The wireless device may additionally configure its wireless transceiver to transmit and receive messages across the wireless network using the preferred set of radio spectrum access parameters, and the device may further initiate a communications session in accordance with the preferred set of radio spectrum access parameters.

In another aspect, the invention is a method of dynamically allocating available radio spectrum to wireless devices operating within a wireless communications system. The method provides a first wireless transceiver and one or more second wireless transceivers, each having at least a physical layer functionality to transmit and receive data across a wireless network. Measurements of radio spectrum conditions are extracted from at least one of the first and the one or more second wireless transceivers, and a range of radio spectrum access parameters is proposed for a communications session between the first and the one or more second wireless transceivers. A set of preferred radio spectrum configurations is then negotiated for the communications session between the first transceiver and the one or more second transceivers. The set of preferred radio spectrum access parameters may represent an optimum set of radio spectrum access parameters, and the set of radio spectrum access parameters may further represent the accessible radio spectrum contiguously or non-contiguously. Given the set of preferred radio spectrum access parameters, the wireless transceiver may be tuned to operate in accordance with the preferred set, and the method further comprises initiating a communications session between the first and one or more second wireless transceivers using the preferred set of radio spectrum access parameters.

Further embodiments, features, and advantages of the present invention, as well as the structure and operation of the various embodiments of the present invention are described in detail below with reference to the accompanying drawings.

BRIEF DESCRIPTION OF THE DRAWINGS

The accompanying drawings, which are incorporated in and constitute part of the specification illustrate embodiments of the invention and, together with the general description given above and the detailed description of the embodiments given below, serve to explain the principles of the present invention. In the drawings.

DETAILED DESCRIPTION OF THE INVENTION

The present invention, as described below, may be implemented in many different embodiments of software, hardware, firmware, and/or the entities illustrated in the figures. Any actual software code with the specialized control of hardware to implement the present invention is not limiting of the present invention. Thus, the operational behavior of the present invention will be described with the understanding that modifications and variations of the embodiments are possible, given the level of detail presented herein.

Figure 1:
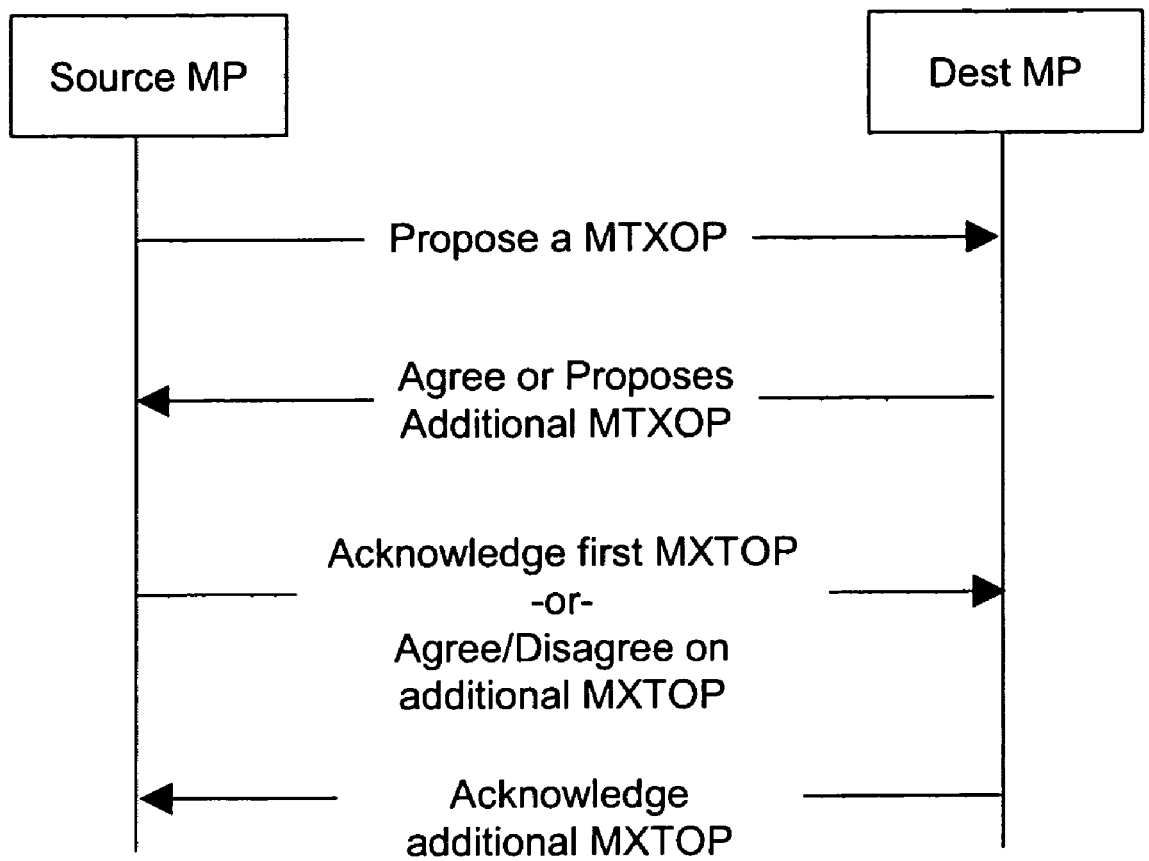
FIG. 1 is an illustration of the proposed Distributed Resource Control Access (DRCA) protocol.
Figure 2:
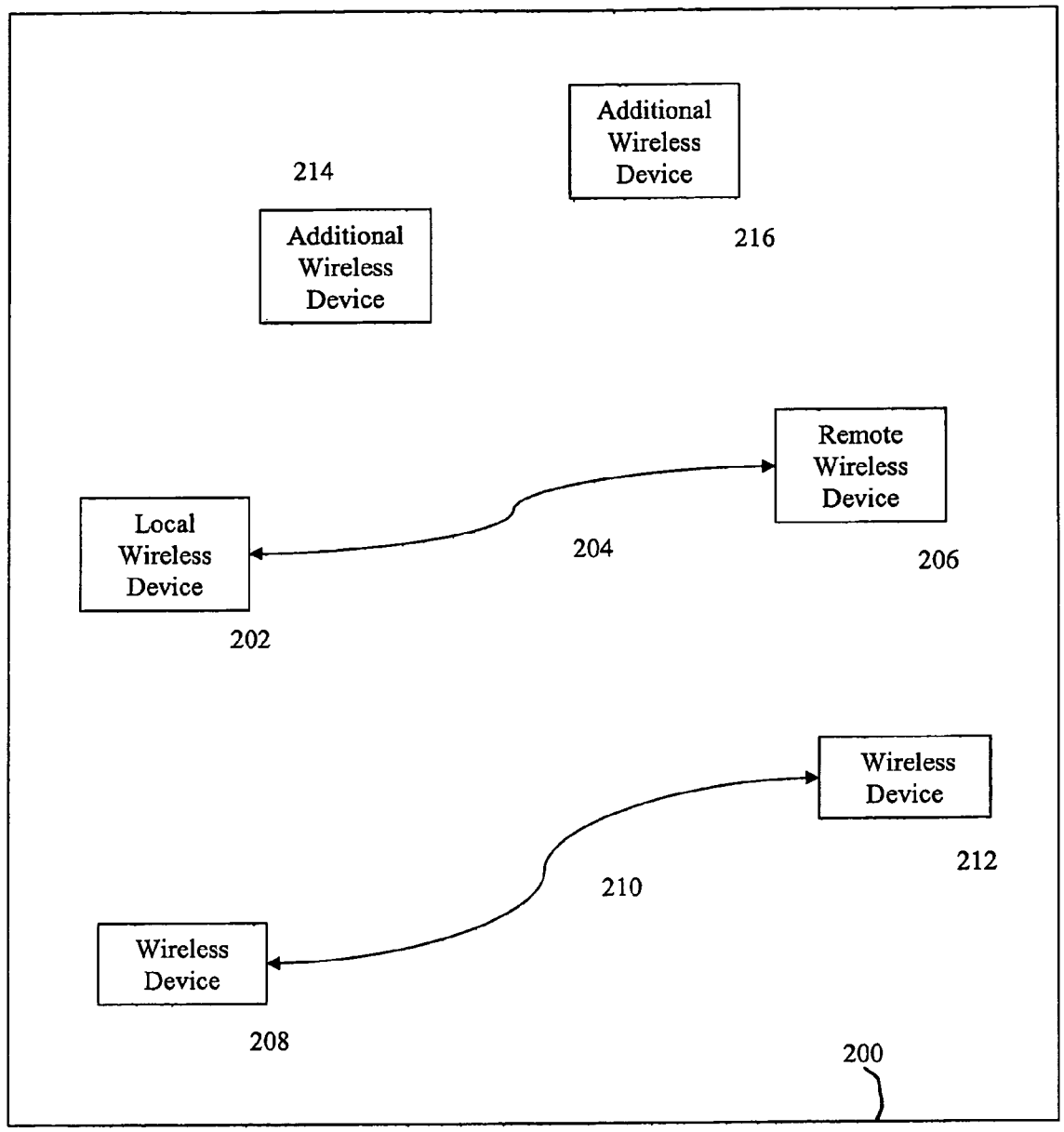
FIG. 2 is an illustration of an exemplary ad hoc wireless network within which the present invention may be implemented.

FIG. 2 is an illustration of an exemplary platform, such as an ad hoc wireless network 200, within which an embodiment of the present invention may be implemented. Although exemplified using an ad hoc wireless network, the present invention may be implemented across a number of wireless communications systems, including pre-planned wireless networks, ad hoc wireless networks, or any combination thereof.

The ad hoc wireless network 200 includes, for example, a local wireless device 202 that accesses a portion of the available radio spectrum to establish a communication session 204 with a remote wireless device 206. The communications session 204 may share its radio spectrum access with an additional communications session 210 between wireless devices 208 and 212. Further, the ad hoc wireless network 200 may also include additional wireless devices 214 and 216, which, although not participating in a communications session, may monitor the radio spectrum access of other wireless devices.

Figure 3:
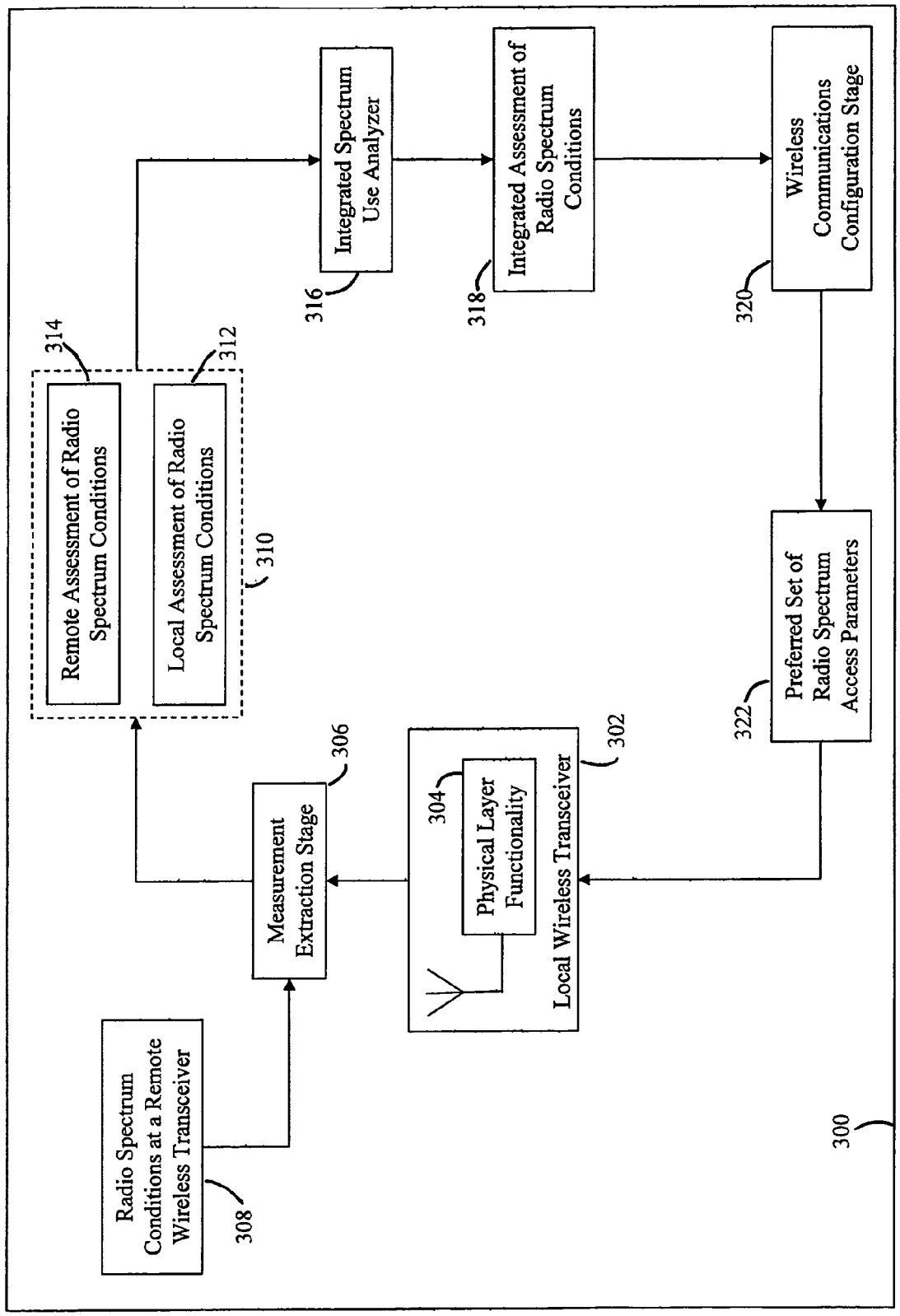
FIG. 3 is a high-level illustration of a wireless device that could be utilized within the exemplary ad hoc network of FIG. 2.

FIG. 3 is a diagram of an exemplary wireless device 300 that is capable of automatically configuring its radio spectrum access in accordance with the present invention. In FIG. 3, the wireless device 300 consists of a local wireless transceiver 302 having at least a physical layer functionality 304 to transmit and receive messages across the wireless communications system. Further, the local wireless transceiver 302 must provide a means of extracting local measurements of radio spectrum conditions and a means of adjusting the radio spectrum access parameters of the wireless transceiver.

The local wireless transceiver 302 is connected to a measurement extraction stage 306 that extracts measurements of the radio spectrum conditions from at least the physical layer functionality 304 of the wireless transceiver 302. The extracted measurements of the radio spectrum conditions at the wireless transceiver are formed into a local assessment of radio spectrum conditions 312 by the measurement extraction stage 306. The measurement extraction stage 306 may also extract measurements from any link layer functionality or higher-level functionality due to Open Systems Interconnection (OSI) layers above the link layer that might be present in the wireless transceiver 302.

The measurement extraction stage 306 also extracts measurements of radio spectrum conditions from a remote wireless transceiver 308. The remote wireless transceiver in FIG. 3 is physically separated from the local wireless transceiver and is located in a remote location. The extracted measurements of radio spectrum conditions from the remote wireless device 308 are formed into a remote assessment of radio spectrum conditions 314 by the measurement extraction stage 306. The remotely extracted measurements could include measurements from any physical layer functionality, link layer functionality or higher-level functionality due to OSI layers above the link layer. The local and remote assessments form together an assessment of radio spectrum conditions 310 that serves as an input to the integrated spectrum use analyzer 316.

The integrated spectrum use analyzer 316 then combines the local assessment of radio spectrum conditions 312 with the remote assessment of radio spectrum conditions 314 to form an integrated assessment of radio spectrum conditions 318. The integrated assessment of radio spectrum conditions 318 includes a range of radio spectrum access parameters that are mutually acceptable to the local and remote wireless transceiver for the communications session, and it may also include a measure of radio spectrum quality across the range of mutually acceptable radio spectrum access parameters.

The integrated assessment of radio spectrum conditions 318 serves input into the wireless communications configuration stage 320. The wireless communications configuration stage 320 selects a preferred set of radio spectrum access parameters 322 for the communications sessions between the local and remote wireless transceivers. In FIG. 3, this set of preferred radio spectrum access parameters 322 is based at least on the integrated assessment of radio spectrum conditions 318, and the preferred set of radio spectrum access parameters may represent either a contiguous or non-contiguous set of radio spectrum access parameters.

The preferred set of radio spectrum access parameters 322 is then passed into the local wireless transceiver 302. The controls of physical layer functionality 304 of the local wireless transceiver 302 are accessed, and these controls are adjusted such that the wireless transceiver operates according to the preferred set of radio spectrum access parameters. Once configured, the local wireless transceiver initiates a communications session with one or more remote wireless transceivers according to the preferred set of radio spectrum conditions.

Figure 4:
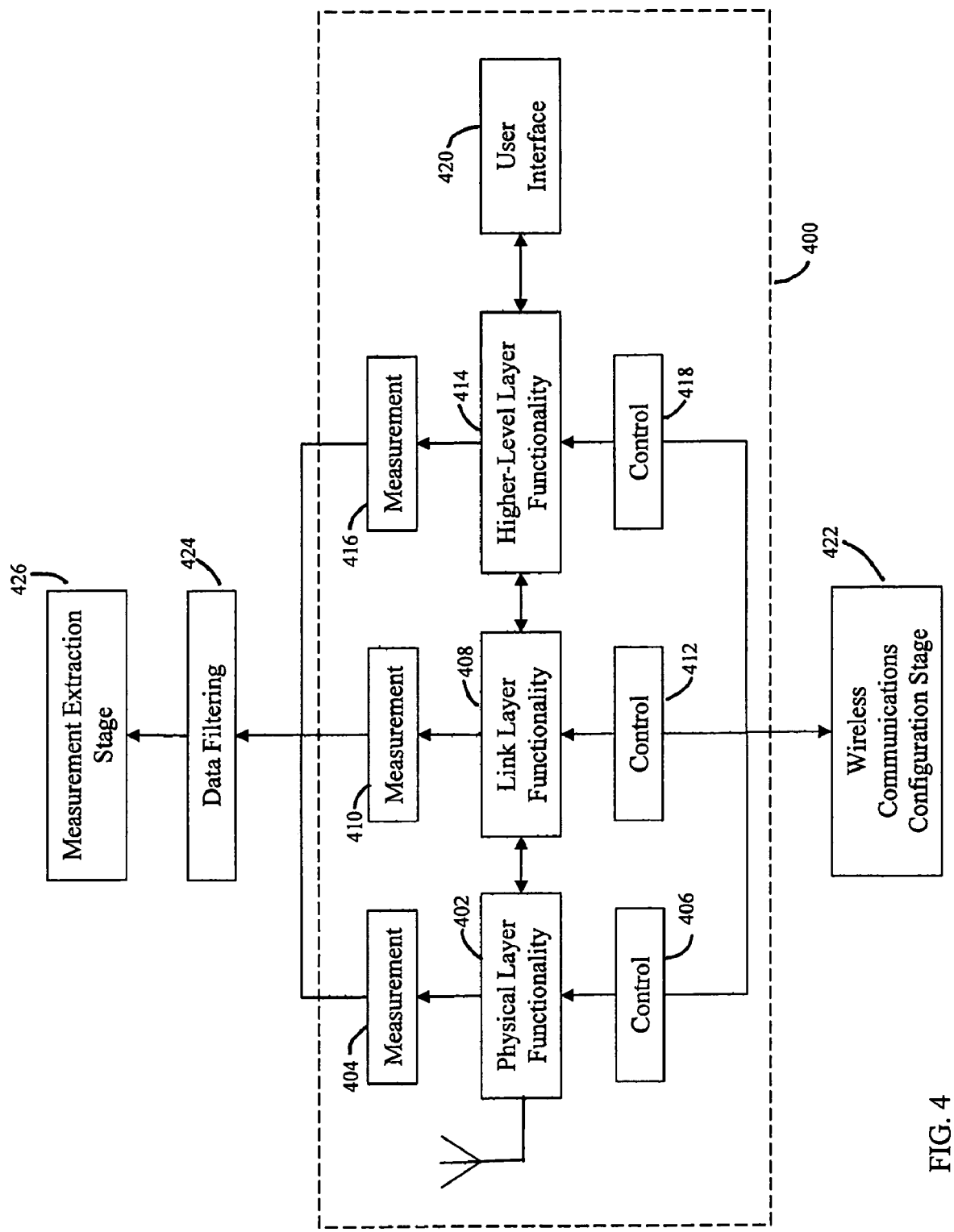
FIG. 4 is a detailed illustration of a wireless transceiver that may be incorporated within exemplary wireless device of FIG. 3.

FIG. 4 is an illustration of a wireless transceiver 400 that may be incorporated within the exemplary wireless device 300 of FIG. 3. The wireless transceiver 400 comprises at least a physical layer of functionality 402 to transmit and receive messages across the wireless communications system. However, practical wireless transceivers also support additional layers of functionality, including a link layer functionality 408 and a higher-level functionality due to OSI layers above the link layer 414. In particular, this higher-level functionality 414 may include a network layer functionality, a transport layer functionality, a session layer functionality, a presentation functionality, and an application layer functionality. These higher-level functionalities may also support a user interface 420.

The wireless transceiver 400 of FIG. 4 possesses a means of accessing physical layer measurements of the wireless network 404, along with a means of extracting link layer measurements 410 and a means of extracting measurements of higher-level functionalities due to OSI layers above the link layer 416. These means of extraction are accessed by the measurement extraction stage 426, and the resulting extracted measurements may be filtered through a data filter 424 to produce a set of filtered, extracted measurements.

The wireless transceiver 400 also possesses a means of configuring its physical layer functionality 406, as well as a means of configuring any link layer functionality 412 and higher-level functionalities 418 that might be present within the wireless transceiver. These means of control are accessed by the wireless communication configuration stage 422 and are responsive to the output of the wireless communication configuration stage 422.

Figure 5:
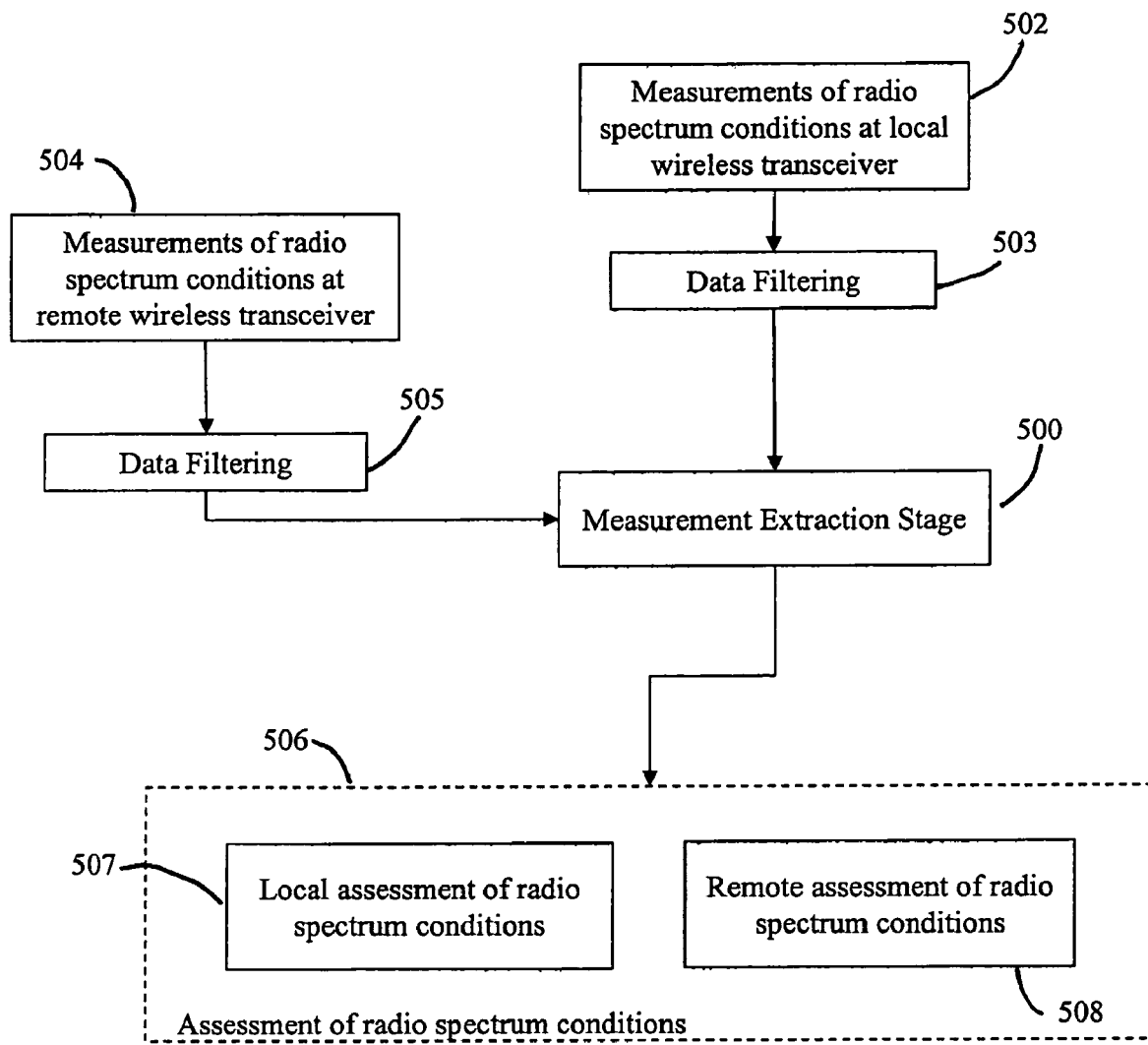
FIG. 5 is a detailed illustration of a measurement extraction stage that may be incorporated within exemplary wireless device of FIG. 3.

FIG. 5 is a detailed illustration of a measurement extraction stage 500 that may be incorporated within the exemplary wireless device 300 of FIG. 3. The measurement extraction stage 500 extracts measurements of radio spectrum conditions 502 from the local wireless transceiver and filters these measurements through a data filter 503. In a similar fashion, measurements of radio spectrum conditions 504 are extracted from a remote wireless transceiver and filtered through a data filter 505. The measurement extraction stage 500 uses a number of techniques to extract measurements from the local and remote wireless transceivers, including direct measurement, peer-to-peer communications, or communications with a central, measurement fusion facility.

The extracted measurements 502 and 504 include not only physical-layer measurements of radio spectrum conditions, but also measurements from any link layer functionality or higher-layer functionalities that are present in the local and remote wireless transceivers. Examples of extracted physical-layer measurements of radio spectrum conditions could include the signal to noise ratio of a given frequency band or channel, the maximum signal to noise ratio, the maximum received signal strength indicator (RSSI), and the sum of all maximum RSSI. For the link layer functionality, examples of extracted measurements include the number of unique media access control (MAC) addresses, the number of unique mesh point MAC addresses, the number of unique ad hoc MAC addresses, the number of unique access point MAC addresses, and the number of observed frames.

The extracted measurements of radio spectrum conditions 502 and 504 are then processed by the measurement extraction stage 500 and formed into an assessment of radio spectrum conditions 506. The assessment of radio spectrum conditions 506 includes both a local assessment 507 and a remote assessment of radio spectrum conditions 508. The assessment of radio spectrum conditions 506 includes measurements of radio spectrum conditions at an individual wireless transceiver and a range of radio spectrum conditions that are acceptable to the individual wireless transceiver for a communications session.

Categorical data may also be included into the assessment of radio spectrum conditions 506. Examples of categorical data include the geographic range of a wireless device with a fixed position and the transient nature of interference experienced by a mobile wireless device.

Figure 6:
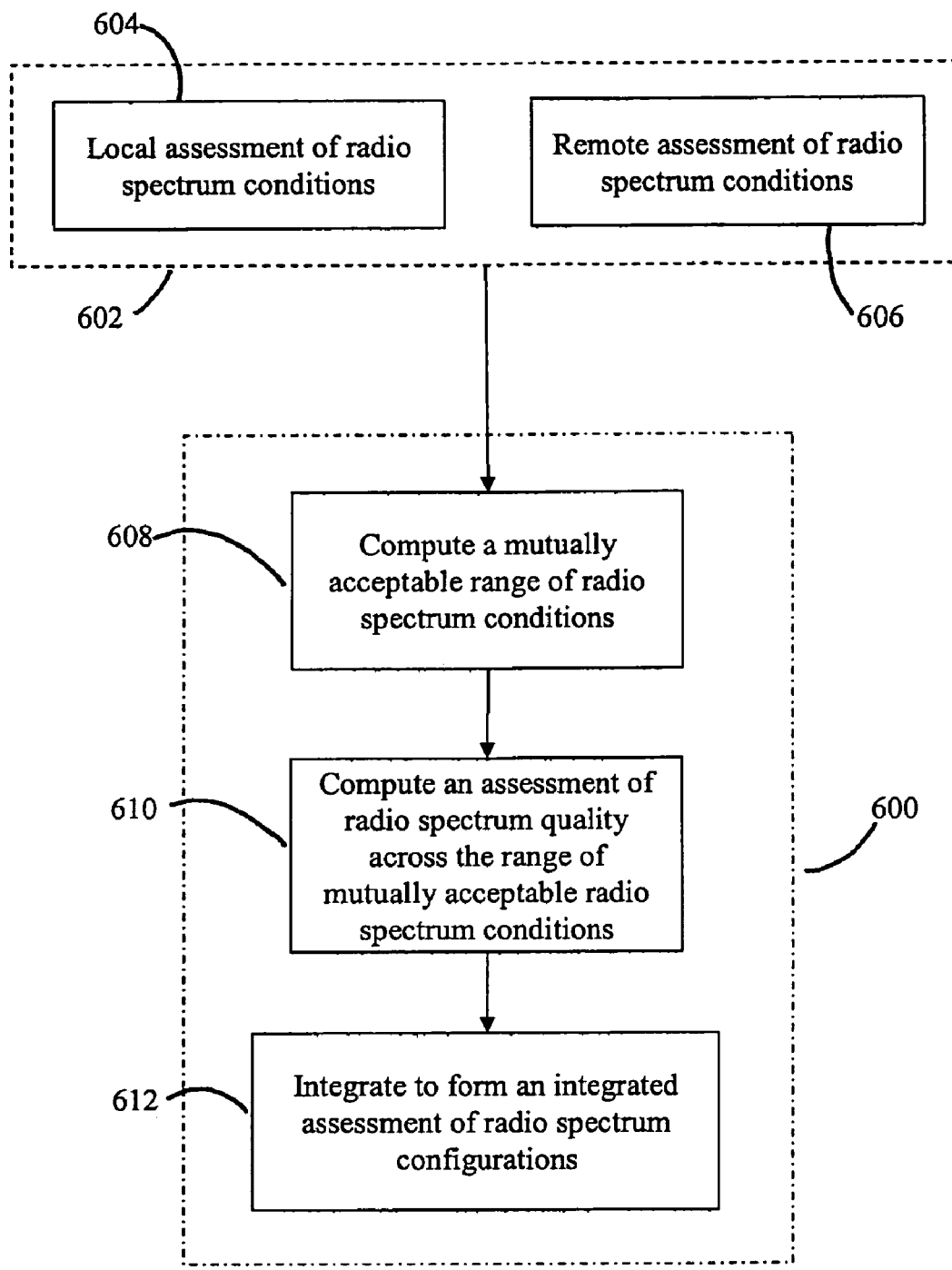
FIG. 6 is a detailed illustration of a integrated spectrum use analyzer that may be incorporated within exemplary wireless device in FIG. 3.

FIG. 6 presents a detailed illustration of an integrated spectrum use analyzer 600 that may be incorporated within the exemplary wireless device 300 of FIG. 3. The integrated spectrum use analyzer 600 receives a local assessment 604 and a remote assessment 606 of radio spectrum conditions as inputs through an assessment of radio spectrum conditions 602. The integrated spectrum analyzer 600 then computes a range of radio spectrum access parameters 608 that are mutually acceptable to the local and remote wireless transceivers (i.e., the transceivers 302 and 308 of FIG. 3) for the proposed communications session. The intersection of the locally and remotely acceptable ranges of radio spectrum access parameters could serve to identify the mutually acceptable range of radio spectrum access parameters.

Given the mutually acceptable range of radio spectrum access parameters 608, the integrated spectrum use analyzer 600 then computes an assessment of radio spectrum quality across a mutually acceptable range of radio spectrum access parameters 610. Radio spectrum quality may be assessed by computing a metric that combines the physical layer measurements, the link layer measurements, and the measurements of OSI layers above the link layer extracted from the local and remote wireless transceivers.

The computed assessment of radio spectrum quality 610 could represent a simple average of measurements from the local and remote wireless transceivers, or it may represent a more sophisticated assessment of radio spectrum conditions that accounts for the positions of interfering networks measured relative to the local and remote wireless transceivers. The assessment could represent radio spectrum quality positively, using a measure of the signal strength between the local and remote wireless transceivers, or negatively, using the interference pattern between the local and remote wireless transceivers The range of mutually acceptable radio spectrum access parameters 608 and the assessment of radio spectrum quality 610 are then combined by the integrated spectrum use analyzer 600 to form an integrated assessment of radio spectrum conditions 612. The integrated assessment of radio spectrum conditions 612 thus describes not only the availability of accessible radio spectrum, but also the quality of this accessible radio spectrum.

Figure 7:
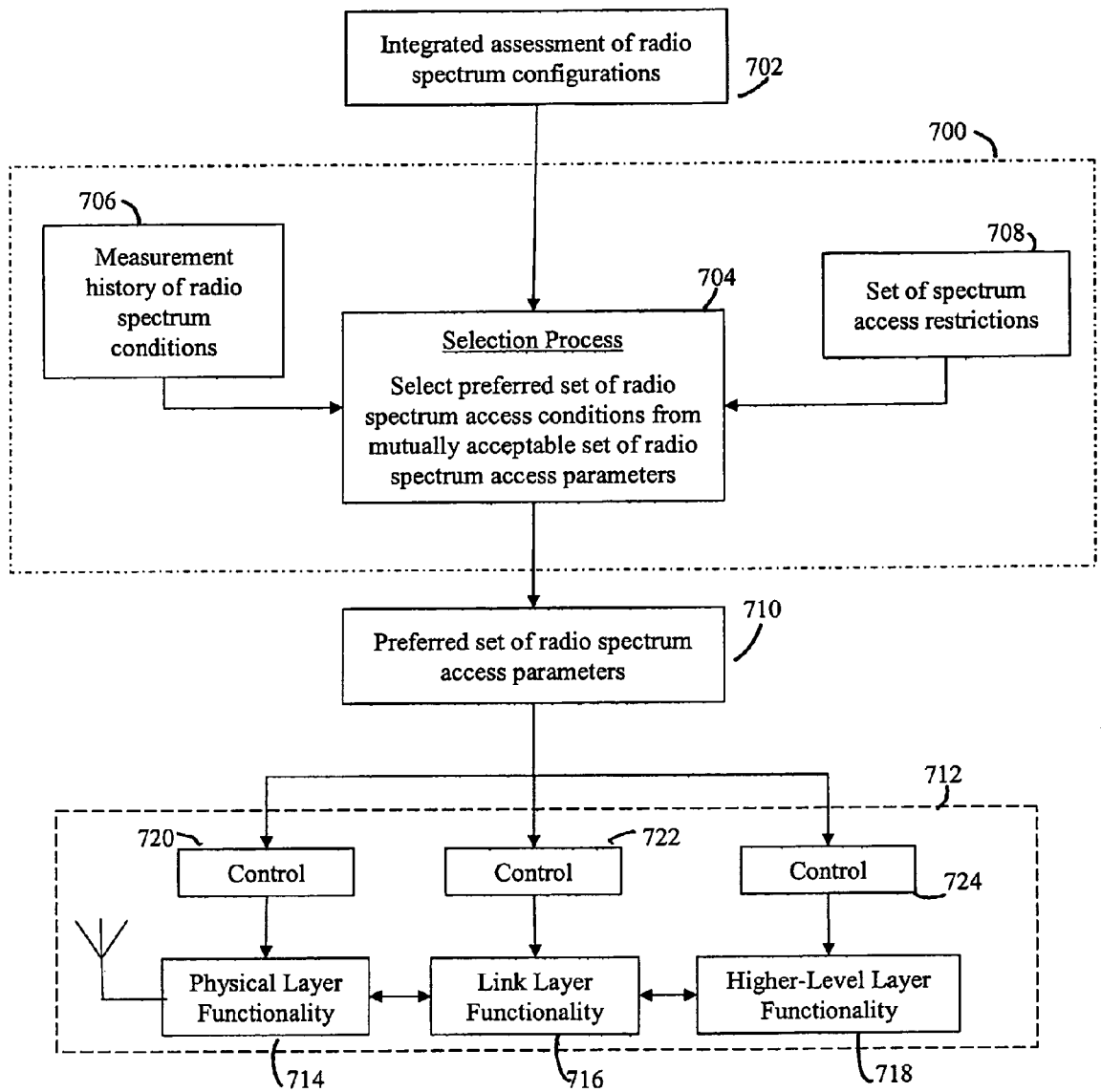
FIG. 7 is an illustration of a wireless communications configuration stage that may be incorporated within exemplary wireless device of FIG. 3.

FIG. 7 is a detailed illustration of a wireless communications configuration stage 700 that may be incorporated within the exemplary wireless device 300 of FIG. 3. In FIG. 7, an integrated assessment of radio spectrum conditions 702 serves as an input to the wireless communications configuration stage 700. A selection process 704 selects a preferred set of radio spectrum access parameters 710 from the range of mutually-acceptable radio spectrum access parameters for the communication session. The selection process 704 is based on at least the assessment of radio spectrum quality included within the integrated assessment of radio spectrum conditions.

The set of preferred radio spectrum access parameters 710 can further represent an optimized set of radio spectrum access parameters, i.e., the set of mutually-acceptable radio spectrum access parameters with the "best" radio spectrum quality. Further, the set of preferred radio spectrum access parameters 710 could represent either a contiguous or a non-contiguous set of radio spectrum access parameters. In this fashion, the set of preferred radio spectrum access parameters 710 is relevant to both conventional wireless devices and the emerging "smart" radio technologies can that agilely access the radio spectrum.

The selection process 704 may incorporate information regarding a measurement history of radio spectrum conditions 706. The measurement history 706 could incorporate any combination of past measurements of physical layer, link layer, and higher-level functionality at the local or remote wireless transceivers. The measurement history 706 could further incorporate the effects of hysteresis, and it could additionally include a model of current radio spectrum conditions that incorporates previous measurements, such as a hidden Markov model. The selection process may also incorporate a set of radio spectrum access restrictions 708 that restrict access to radio spectrum due to regulatory or policy considerations.

Once selected, the preferred set of radio spectrum access parameters 710 is then passed to a local wireless transceiver 712, and control structures of physical layer functionality 720, link layer functionality 722, and high-level functionalities 724 are adjusted to in accordance with the preferred set of radio spectrum access parameters 710. The local wireless transceiver may then initiate a communications session with one or more remote wireless transceivers in which physical layer functionality 714, link layer functionality 716, and high-level layer functionalities 718 operate according to the preferred set of radio spectrum access parameters.

Figure 8:
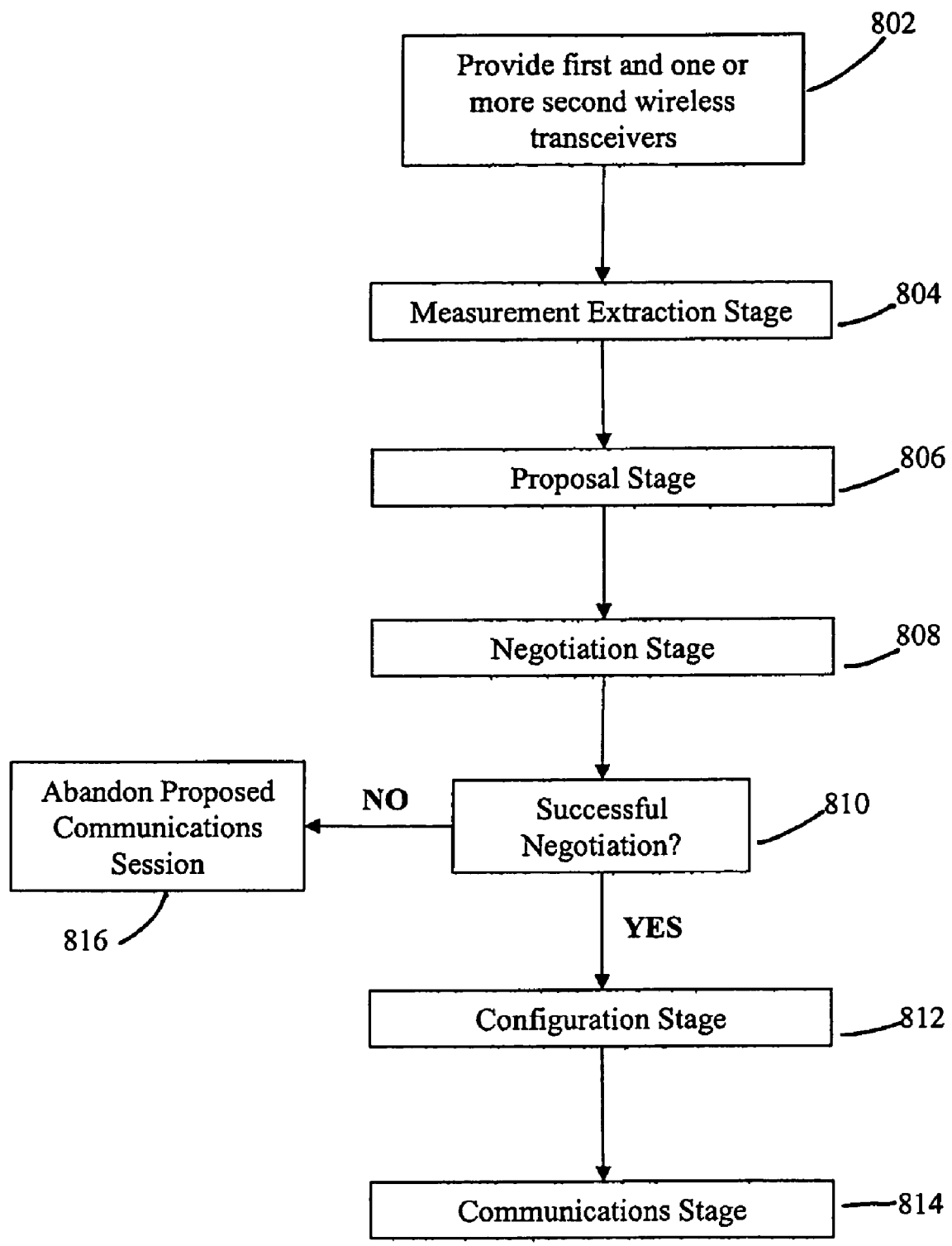
FIG. 8 is an exemplary method of practicing an embodiment of the present invention.

FIG. 8 is an illustration of an exemplary method of practicing an embodiment of the present invention. In FIG. 8, a first wireless transceiver and one or more second wireless transceivers are provided within a wireless exemplary network in step 802. Both the first and the one or more second wireless transceivers possess at least a physical layer functionality to transmit and receive data across a wireless network. However, practical devices could also possess a link layer functionality, a higher-level functionality due to OSI layers above the link layer, and a user interface.

Measurements of the radio spectrum conditions are extracted from the first wireless transceiver and from the one or more second wireless transceivers in step 804. The extraction process could incorporate any number of techniques, including the direct measurement of radio spectrum conditions on a given transceiver, the receipt of radio spectrum measurements due to peer-to-peer communication between transceivers, and the communication with a central, message fusion facility.

Further, the extracted measurements include not only physical-layer measurements, but also measurements of any link layer functionality or high-level functionalities that are present within the wireless transceiver. Examples of extracted physical layer measurements include the signal to noise ratio of a given frequency band or channel, the maximum signal to noise ratio, the maximum received signal strength indicator (RSSI), and the sum of all maximum RSSI. Examples of extracted link layer measurements include the number of unique MAC addresses, the number of unique mesh point MAC addresses, the number of unique ad hoc MAC addresses, the number of unique access point MAC addresses, and the number of observed frames.

Step 806 represents the proposal stage, in which a range of radio spectrum access parameters is proposed for a communication session between a first wireless transceiver and one or more second wireless transceivers. The range of radio spectrum accessed parameters proposed in step 806 could represent those radio spectrum access parameters deemed acceptable for a communication session at the first wireless transceiver, or those deemed acceptable at the one or more second transceivers. Further, the range of radio spectrum access parameters proposed in step 806 could include any combination of physical layer, link layer, or high-level layer radio spectrum access parameters.

The proposed set of radio spectrum conditions from the proposal stage in step 806 passes into the negotiation stage in step 808. Step 810 then determines whether a set of preferred radio spectrum access parameters has been successfully negotiated within the negotiation stage of step 808.

If a set of preferred radio spectrum access parameters were successfully negotiated, then the set of preferred radio spectrum access parameters serves as an input into the configuration stage in step 812. In the configuration stage of step 812, the functionalities of the wireless transceiver are adjusted to operate according to the set of preferred radio spectrum access parameters. The wireless communications session may then be initiated between the first and the one or more second wireless transceivers in the communications stage of step 714 according to the preferred set of radio spectrum access parameters. If the negotiation stage of step 808 fails to negotiate a set of preferred radio spectrum access parameters, then the communications session is abandoned in step 814.

Figure 9:
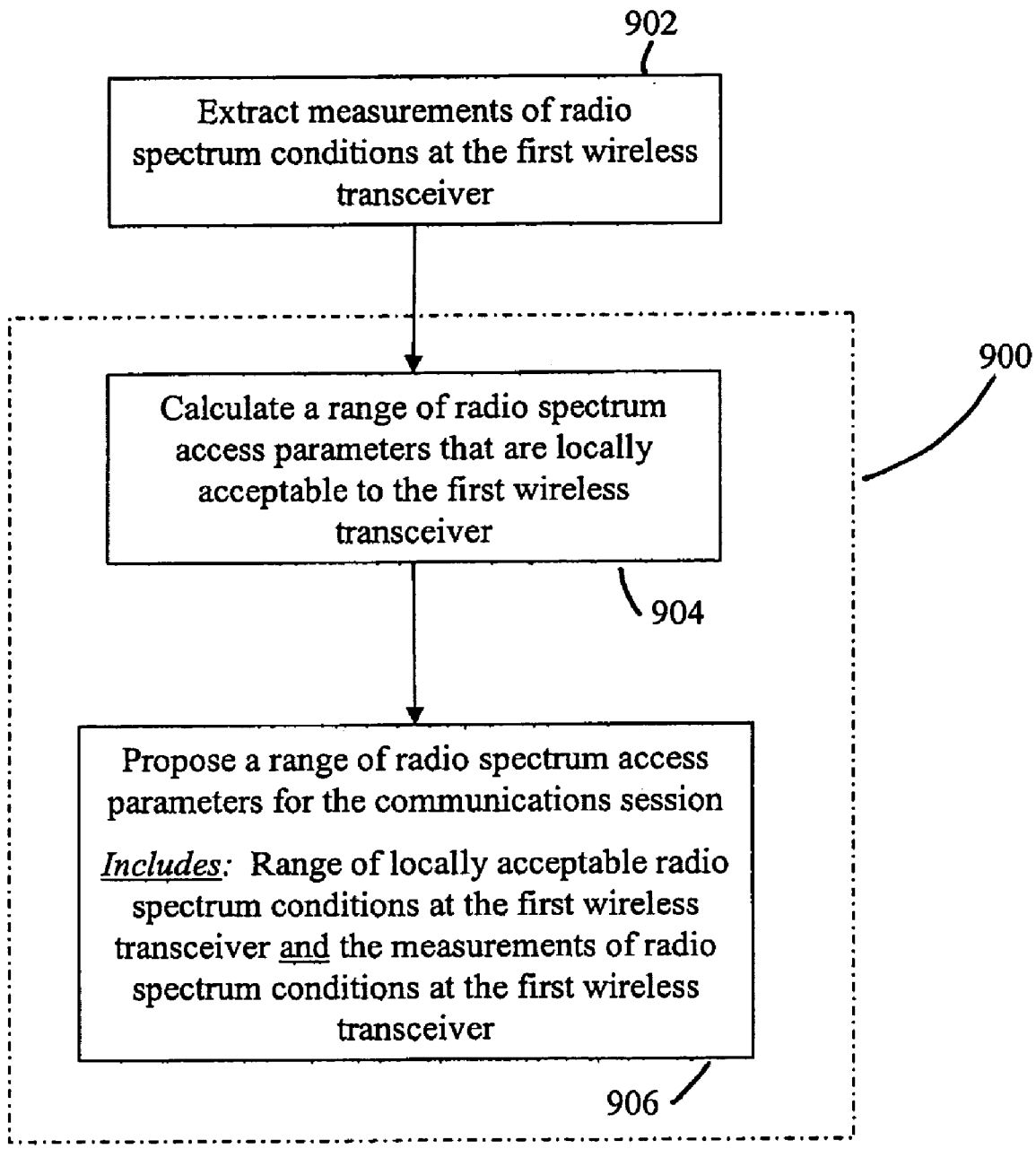
FIG. 9 is a detailed flow chart of a proposal stage that may be incorporated within exemplary method in FIG. 8.

FIG. 9 is a detailed illustration of a proposal stage 900 that could be incorporated within the exemplary method of FIG. 8. In step 902, measurements of radio spectrum conditions extracted from first wireless transceiver serve as inputs into the proposal stage 900. In step 904, the first wireless transceiver identifies a range of radio spectrum access parameters that is deems locally acceptable for the proposed communications session. Then, in step 906, the first wireless transceiver proposes a set of radio spectrum conditions for a communications session with one or more second wireless transceivers. The proposed radio spectrum access parameters could represent those that are deemed locally acceptable to the first wireless transceiver. Additionally, the proposal could include measurements of radio spectrum conditions extracted from first wireless transceiver.

Figure 10:
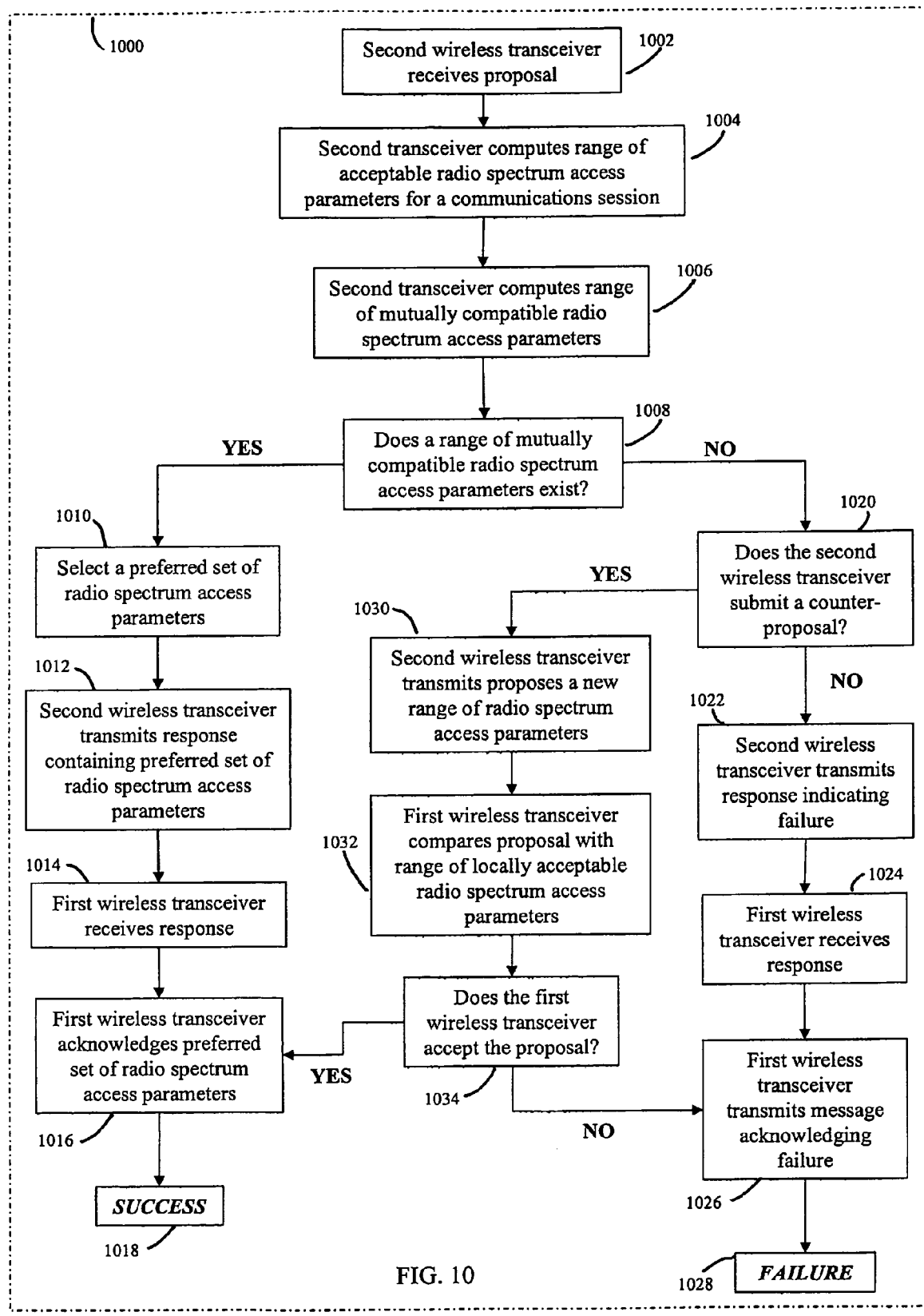
FIG. 10 is a detailed flow diagram of a negotiation stage that may be incorporated within exemplary method in FIG. 8.

FIG. 10 is a detailed illustration of a negotiation stage 1000 that could be incorporated within the exemplary method of FIG. 8. In step 1002, a second wireless transceiver receives the proposed set of radio spectrum access parameters from the first wireless transceiver. The second wireless transceiver then computes a range of radio spectrum parameters that it finds locally acceptable for a communications session, as indicated in step 1004. Then, in step 1006, the second wireless transceiver compares its locally acceptable range of radio spectrum access parameters with the proposed range of radio spectrum access parameters to identify a range of mutually acceptable radio spectrum parameters.

Step 1008 then determines whether a range of mutually acceptable radio spectrum access parameters have been identified in step 1006. If a range of mutually acceptable radio spectrum access parameters were identified, the second wireless transceiver selects a preferred set of radio spectrum access parameters from this mutually acceptable range in step 1010. Then, as indicated in step 1012, the second wireless transceiver transmits a response to the first wireless transceiver that contains the preferred set of radio spectrum access parameters. Upon receipt of the response in step 1014, the first wireless transceiver transmits an acknowledgement to the second wireless transceiver verifying the set of preferred radio spectrum access parameters in step 1016. Upon receipt at the second wireless transceiver, the negotiation process completes successfully in step 1018, and the set of preferred radio spectrum access parameters is passed to the configuration stage of the exemplary method of FIG. 8.

If a range of mutually acceptable radio spectrum access parameters could not be identified from within the proposed set of radio spectrum access parameters, then the second wireless transceiver would be provided an opportunity to submit a counter-proposal to the first wireless transceiver in step 1020.

If the second wireless transceiver were not to submit a counter-proposal, then it would transmit a response to the first wireless transceiver indicating a failed negotiation, as indicated in step 1022. The response may additionally include the various reasons for the failed negotiation, including an incompatible range of radio spectrum access parameters and an incompatible set of session parameters (such as session initiation time or session duration). In step 1024, the first wireless transceiver receives the response from the second wireless transceiver indicating the failed negotiation, and then transmits a message to the second wireless acknowledging that failure in step 1026. The negotiation process ends in failure in step 1028.

If the second wireless transceiver were to submit a counter-proposal in step 1020, it transmits a message to the first wireless transceiver acknowledging failure and proposing an additional range of radio spectrum access parameters for the communications session in step 1030. Upon receipt of the counter-proposal in step 1032, the first wireless transceiver compares the counter-proposed range of radio spectrum access parameters with the range of radio spectrum access parameters that it deems acceptable for the communications session. The first wireless transceiver then either accepts or rejects this counterproposal in step 1034.

If the first wireless transceiver were to accept the counter-proposal, then it would acknowledge the successful negotiation by transmitting a message to the second wireless transceiver confirming the preferred set of radio spectrum access parameters in step 1016. The negotiation process is then completed successfully in step 1018. If the first wireless transceiver were to reject the counter-proposal, then it would transmit a message acknowledging the rejection to the second wireless transceiver in step 1026. The negotiation process then ends in failure in step 1028.

Figure 11:
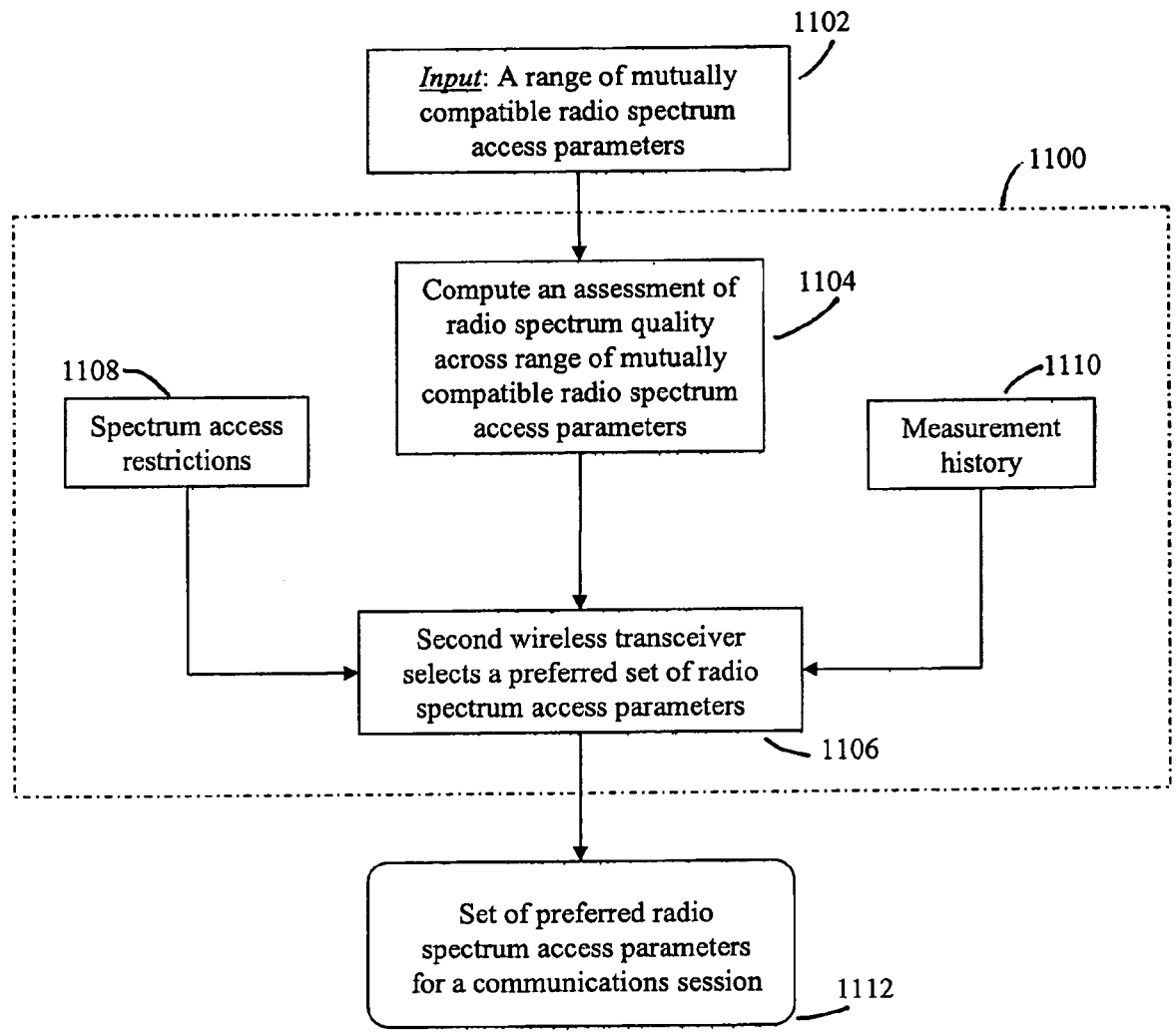
FIG. 11 is a detailed flow diagram of a selection process that may incorporated within the exemplary negotiation stage of FIG. 10.

FIG. 11 details the selection of the preferred set of radio spectrum access parameters 1100 within the exemplary negotiation stage 1000 of FIG. 10. Given a range of mutually acceptable radio spectrum access parameters in step 1102, the second wireless transceiver then computes an assessment of radio spectrum quality across the range of mutually acceptable radio spectrum access parameters in step 1104.

The assessment in step 1104 could be calculated in a multi-step process. Individual assessments of radio spectrum quality could be computed for the proposed range of radio spectrum access parameters and for the range of radio spectrum access parameters that are locally acceptable to the second wireless transceiver. These individual assessments could then be combined to form an assessment of radio spectrum quality across the mutually acceptable range of radio spectrum access parameters.

The individual assessments of radio spectrum quality from step 1104 could represent any combination of physical layer measurements and link layer measurements extracted from the first and the one or more second wireless transceivers. Further, the assessment computed in step 1104 could represent a level of impairment (i.e., a product of duty cycle and interference) across the range of mutually acceptable radio spectrum access parameters. The assessment in step 1104 could alternatively represent a physical layer measurement, such as the level of interference across the range of mutually acceptable radio spectrum configurations.

In step 1106, the second wireless transceiver selects a preferred set of radio spectrum configurations from the set of mutually acceptable radio spectrum configurations based on the assessment of radio spectrum quality. The set of preferred set of radio spectrum configurations 1112 could additionally represent an optimized set of radio spectrum conditions, i.e., the set of mutually-acceptable radio spectrum access parameters with the "best" radio spectrum quality. Further, the selected set of preferred radio spectrum access parameters 1112 could represent either a contiguous or a non-contiguous set of radio spectrum access parameters. In this fashion, the selected set of radio spectrum access parameters is relevant to both conventional wireless devices and the emerging "smart" radio technologies can that agilely access the radio spectrum The selection process in step 1106 may also incorporate a measurement history 1108 of the first and the one or more second wireless transceivers. The measurement history in step 1108 could reflect the effects of hysteresis in past measurements in an effort to improve the stability of the selection process in step 1106. Alternatively, the measurement history in step 1108 could state a model of current radio spectrum conditions that incorporates a history of past measurements, such as a Hidden Markov Model. The selection process in step 1106 may further include a set of spectrum access restrictions 1110 that restrict the available spectrum based on policy or regulatory considerations. The selected set of preferred radio spectrum conditions 1112 then passes back into the exemplary negotiation stage of FIG. 10.

CONCLUSION

The present invention provides a wireless device capable of automatically and dynamically allocating its radio spectrum access within an ad hoc or preplanned wireless network. The present invention also provides a method through which such a wireless device may automatically and dynamically configure its access to radio spectrum within an ad hoc or preplanned wireless network.

The present invention assesses both the availability of radio spectrum access in a wireless network and the quality of that accessible radio spectrum. Through this dual assessment, the present invention identifies a set of preferred radio spectrum access parameters that utilizes radio spectrum resources.

The present invention also characterizes the accessible radio spectrum through conventional means such as contiguous blocks of channels and through less conventional, non-contiguous assessments of radio spectrum access. In this fashion, the present invention is applicable to both conventional radio and emerging "smart" radio technologies that agilely access radio spectrum resources.

Further, the present invention includes a negotiation protocol for selecting a set of preferred radio spectrum parameters that provides information on both successful and failed negotiations. By detailing the causes of a failed negotiation, the present invention could adaptively tailor its negotiation strategy to improve future performance.

The present invention has been described above with the aid of functional building blocks illustrating the performance of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art (including the contents of any references cited herein), readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What I claim is:

1. A wireless device capable of dynamically allocating radio spectrum access within a wireless communication system, the device comprising:
    a wireless transceiver, the wireless transceiver having at least a physical layer functionality to transmit and receive data across a wireless network;
    means for extracting measurements of radio spectrum conditions from at least one of: (i) a local wireless transceiver and (ii) a remote wireless transceiver to form an assessment of radio spectrum conditions;
    means for integrating the assessment of radio spectrum conditions to form an integrated assessment of radio spectrum conditions between the local wireless transceiver and the remote wireless transceiver; and
    means for selecting a preferred set of radio spectrum access parameters for a communications session between the local wireless transceiver and the remote wireless transceiver.

2. The wireless device of claim 1, wherein the wireless transceiver possesses any combination of: (i) a link layer functionality, (ii) a higher-level functionality due to Open Systems Interconnection (OSI) layers above the link layer, and (iii) a user interface.

3. The wireless device of claim 1, wherein the means for extracting measurements of radio spectrum conditions further comprises at least one of: (i) measuring radio spectrum conditions, (ii) receiving measurements of radio spectrum conditions through peer-to-peer communications and (iii) receiving measurements of radio conditions from a measurement processing unit to form the assessment of radio spectrum conditions.

4. The wireless device of claim 1, wherein the means for extracting measurements of radio spectrum conditions further comprises measuring radio spectrum conditions at the local wireless transceiver to form a local assessment of radio spectrum conditions.

5. The wireless device of claim 1, wherein the means for extracting measurements of radio spectrum conditions further comprises extracting measurements of radio spectrum conditions from the remote wireless transceiver to form a remote assessment of radio spectrum conditions.

6. The wireless device of claim 1, wherein the means for extracting measurements further comprises processing the extracted measurements through a data filter to produce a filtered set of extracted measurements.

7. The wireless device of claim 1, wherein the means for integrating the assessment of radio spectrum conditions further comprises:
    i. means for determining a range of radio spectrum access parameters that is mutually acceptable to both the local and remote wireless transceivers;
    ii. means for assessing radio spectrum quality across the range of mutually acceptable radio spectrum access parameters to produce an assessment of radio spectrum quality; and
    iii. means for combining the assessment of radio spectrum quality with the range of mutually acceptable radio spectrum access conditions to form an integrated assessment of radio spectrum conditions.

8. The wireless device of claim 7, wherein the means for assessing radio spectrum quality further comprises computing a metric based on at least one of: (i) the physical layer measurements, (ii) the link layer measurements, and (iii) measurements of OSI layers above the link layer extracted from the local and remote wireless transceivers.

9. The wireless device of claim 1, wherein the set of preferred radio spectrum access parameters is selected on the basis of at least one of: (i) the integrated assessment of radio spectrum conditions between the local and the remote wireless transceivers, (ii) a measurement history of the radio spectrum conditions, and (iii) a set of spectrum access restrictions.

10. The wireless device of claim 1, wherein the preferred set of radio spectrum access parameters represents an optimized set of radio spectrum access parameters.

11. The wireless device of claim 1, wherein the set of preferred radio spectrum access parameters represents one of: (i) a contiguous set of radio spectrum access parameters or (ii) a non-contiguous set of radio spectrum access parameters.

12. The wireless device of claim 1, wherein the wireless device further comprises a means for configuring the wireless transceiver to operate according to the preferred set of radio spectrum access parameters.

13. The wireless device in claim 1, wherein the wireless device further comprises a means to initiate the communications session between the local wireless transceiver and the remote wireless transceiver in accordance with the set of preferred radio spectrum access parameters.

14. A method of dynamically allocating available radio spectrum access to wireless devices operating within a wireless communications system, the method comprising:
   providing a first wireless transceiver and one or more second wireless transceivers, the first and second wireless transceivers having at least a physical layer functionality to transmit and receive data across a wireless network;
   extracting measurements of radio spectrum conditions from at least one of: (i) the first wireless transceiver and (ii) the one or more second wireless transceivers;
   proposing a range of radio spectrum access parameters for a communications session between the first wireless transceiver and the one or more second wireless transceivers;
   negotiating a set of preferred radio spectrum access parameters for the communications session between the first transceiver and the one or more second transceivers.

15. The method of claim 14, wherein the first and the one or more second wireless transceivers possess any combination of: (i) a link layer functionality, (ii) a higher-level functionality due to Open Systems Interconnection (OSI) layers above the link layer, and (iii) a user interface.

16. The method of claim 14, wherein the extracting further comprises at least one of: (i) measuring radio spectrum conditions, (ii) receiving measurements of radio spectrum conditions from the first or the one or more second wireless transceivers, and (iii) receiving measurements of radio conditions from a measurement processing unit.

17. The method of claim 14, wherein the extracting further comprises filtering the measurements through a data filter to produce a filtered set of extracted measurements.

18. The method of claim 14, wherein the proposing further comprises proposing a range of radio spectrum access parameters that is locally acceptable to the first wireless transceiver for the communications session.

19. The method of claim 14, wherein the negotiating further comprises:
   receiving the range of proposed radio spectrum access parameters at the one or more second wireless transceivers;
   determining a range of radio spectrum access parameters that is locally acceptable to the one or more second wireless transceivers;
   selecting a set of preferred radio spectrum access parameters for the communications session between the first and the one or more second wireless transceivers; and
   acknowledging a negotiation status for the negotiation of the set of optimized radio spectrum access parameters for the communications session between the first and the one or more second wireless transceivers.

20. The method of claim 19, wherein the acknowledging further comprises acknowledging one of: (i) a successfully negotiated set of preferred radio spectrum access parameters and (ii) a failed negotiation.

21. The method of claim 20, wherein the acknowledging further comprises transmitting the set of preferred radio spectrum access parameters from the one or more second wireless transceivers to the first wireless transceiver.

22. The method of claim 20, wherein the acknowledging further comprises transmitting one or more reasons for the failed negotiation from the one or more second wireless transceivers to the first wireless transceiver.

23. The method of claim 20, wherein the acknowledging further comprises:
   i. transmitting an additional range of radio spectrum access parameters from the one or more second wireless transceivers to the first wireless transceiver;
   ii. comparing the range of additional radio spectrum access parameters with the extracted measurements of radio spectrum conditions from the first wireless transceiver to obtain a compatible set of radio spectrum access parameters; and
   iii. acknowledging the compatible set of radio spectrum access parameters with the one or more second wireless transceivers.

24. The method of claim 14, wherein the set of preferred radio spectrum access parameters represents one of (i) a contiguous set of radio spectrum access parameters or (ii) a non-contiguous set of radio spectrum access parameters.

25. The method of claim 24, wherein the selecting further comprises:
   i. determining a range of radio spectrum access parameters that is mutually acceptable to both the first and the one or more second wireless transceivers;
   ii. computing an assessment of radio spectrum quality for each set of radio spectrum conditions within the range of mutually acceptable access parameters; and
   iii. selecting the set of preferred radio spectrum access parameters from the mutually acceptable range of radio spectrum access parameters on the basis of the assessment of radio spectrum quality.

26. The method of claim 25, wherein the computing further comprises computing a metric based on at least one of: (i) the physical layer measurements, (ii) the link layer measurements, and (iii) measurements of OSI layers above the link layer extracted from the first and the one or more second wireless transceivers.

27. The method of claim 25, wherein the set of preferred radio spectrum access parameters is selected on the basis of at least one of: (i) a measurement history of radio spectrum conditions and (i) a set of spectrum access restrictions.

28. The method of claim 25, wherein the set of preferred radio spectrum access parameters represents an optimized set of radio spectrum access parameters.

29. The method of claim 14, further comprising configuring the first and the one or more second wireless transceivers to operate according to the set of preferred radio spectrum access parameters.

30. The method of claim 14, further comprising initiating the communications session between the first and one or more second wireless transceivers according to the set of preferred radio spectrum access parameters.

* * * * *